(12) United States Patent
Clement (10) Patent No.: US 12,485,653 B2
(45) Date of Patent: Dec. 2, 2025

(54) METHOD FOR MANUFACTURING A DECORATIVE PANEL AND A DECORATIVE PANEL

(71) Applicant: Unilin, BV, Wielsbeke (BE)

(72) Inventor: Benjamin Clement, Waregem (BE)

(73) Assignee: Unilin, BV, Wielsbeke (BE)

( * ) Notice: Subject to any disclaimer, the term of this patent is extended or adjusted under 35 U.S.C. 154(b) by 147 days.

(21) Appl. No.: 18/155,891

(22) Filed: Jan. 18, 2023

(65) Prior Publication Data

US 2023/0234339 A1 Jul. 27, 2023

(30) Foreign Application Priority Data

Jan. 25, 2022 (EP) ..................... 22153084

(51) Int. Cl.
| | | |
|---|---|---|
| B32B 21/06 | (2006.01) | |
| B05D 7/00 | (2006.01) | |
| B32B 21/10 | (2006.01) | |
| B32B 38/00 | (2006.01) | |
| B32B 38/08 | (2006.01) | |
| B41J 2/01 | (2006.01) | |
| B44C 5/04 | (2006.01) | |

(52) U.S. Cl.
CPC ............. *B32B 21/06* (2013.01); *B05D 7/534* (2013.01); *B32B 21/10* (2013.01); *B32B 38/08* (2013.01); *B32B 38/164* (2013.01); *B44C 5/0469* (2013.01); *B32B 2250/02* (2013.01); *B32B 2260/028* (2013.01); *B32B 2260/046* (2013.01); *B32B 2451/00* (2013.01); *B41J 2/01* (2013.01)

(58) Field of Classification Search
CPC ........ B05D 7/534; B44C 5/0469; B32B 21/06
See application file for complete search history.

(56) References Cited

U.S. PATENT DOCUMENTS

| | | |
|---|---|---|
| 9,770,937 B2 | 9/2017 | Clement |
| 11,148,451 B2 | 10/2021 | Clement et al. |
| 2014/0170359 A1* | 6/2014 | Schwitte ................. B32B 27/10 428/41.5 |
| 2016/0347084 A1 | 12/2016 | Clement et al. |
| 2020/0108651 A1* | 4/2020 | Clement .................. B41M 5/52 |
| 2022/0001572 A1 | 1/2022 | Clement et al. |

FOREIGN PATENT DOCUMENTS

| | | | |
|---|---|---|---|
| CN | 109403139 A | * | 3/2019 |
| EP | 1044822 B1 | | 10/2000 |
| EP | 1290290 B1 | | 3/2003 |
| EP | 1749676 B1 | | 2/2007 |
| EP | 1857511 B1 | | 11/2007 |
| EP | 1872959 B1 | | 1/2008 |
| EP | 2274485 B1 | | 1/2011 |
| EP | 2293946 B1 | | 3/2011 |
| EP | 2431190 B1 | | 3/2012 |

(Continued)

*Primary Examiner* — Jacob T Minskey
*Assistant Examiner* — Virak Nguon
(74) *Attorney, Agent, or Firm* — Capitol City TechLaw (57) ABSTRACT

A method for manufacturing a laminate assembly may involve providing a decorative paper, impregnating the decorative paper with a first thermosetting resin, and laminating the resin provided decorative paper on a substrate. The decorative paper may be impregnated with a second thermosetting resin before being laminated.

14 Claims, 2 Drawing Sheets

(56) References Cited

FOREIGN PATENT DOCUMENTS

| EP | 3932686 A1 | 6/2022 |
|----|------------|--------|
| WO | 2011124503 A2 | 10/2011 |
| WO | 2014084787 A1 | 6/2014 |
| WO | 2015118451 A1 | 8/2015 |
| WO | 2015140682 A1 | 9/2015 |

* cited by examiner

METHOD FOR MANUFACTURING A DECORATIVE PANEL AND A DECORATIVE PANEL

This application claims priority under 35 USC 119 (a)-(d) from EP patent application Ser. No. 22/153,084.3 filed on Jan. 25, 2022, the entire contents of which are incorporated herein by reference.

BACKGROUND

1. Field

The present invention relates to a method for manufacturing a laminate assembly, for example a decorative panel, preferably floor, wall or furniture panels. The invention may further a decorative panel. According to a variant the manufacturing method can also be related to manufacturing laminate assembly other than a panel, such as in so-called CPL (compact laminate) or HPL (high pressure laminate).

More particularly the invention is related to a method for manufacturing laminate panels, wherein said panels at least comprise a substrate material and a provided thereon top layer with a printed decor. The method could be used for manufacturing panels, the top layer of which is formed from thermosetting resin and one or more paper layers, wherein said paper layers comprise a decor paper having a printed pattern. The panels of the invention may relate to furniture panels, ceiling panels, flooring panels or similar, wherein these panels preferably comprise a wood based substrate, such as an MDF or HDF substrate (Medium or High Density Fiberboard) or a substrate material consisting of or essentially made of wood particleboard. Alternatively the panels can comprise a polymeric based substrate, preferably thermoplastic based substrate, such as PVC (Polyvinyl chloride), PP (Polypropylene), LVT (Luxury Vinyl Tile), SPC (Solid Polymer Composite) or WPC (Wood polymer composite) based substrate. The invention can further relate to mineral-based board of cement-based board, like for example, fiber cement based board or magnesium oxide based board.

2. Discussion of Related Art

Traditionally, the decor or pattern of such panels is printed on paper by means of offset or rotogravure printing. The obtained paper is taken up as a decorative paper in a so-called laminate panel. For manufacturing the panels the DPL process can be practiced. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to EP 1 290 290, from which it is further known to provide a relief in said melamine surface during the same press treatment or pressing operation, namely by bringing said melamine surface in contact with a structured press element, for example a structured press plate. In case of HPL or CPL the decorative paper and optionally the wear layer is pressed on kraft paper.

The printing of paper by means of an analog printing process, such as by rotogravure or offset printing, at affordable prices inevitably leads to large minimal order quantities of a particular decorative paper or foil and restricts the attainable flexibility. A change of decor or pattern necessitates a standstill of the printing equipment of about 8 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns, be it on paper, on foil or directly on a plate-shaped substrate possibly with the intermediary of preparatory layers. Such digital techniques can enhance the flexibility in the printing of decors significantly. Reference is amongst others made to the EP 1 872 959, WO 2011/124503, EP 1 857 511, EP 2 431 190, EP 2 293 946, WO 2014/084787, WO 2015/140682 and the WO 2015/118451, where such techniques are disclosed.

EP 1 044 822, EP 1 749 676 and EP 2 274 485 disclose the use of an inkjet receiver coating to enhance the printing quality on a raw decor paper. Such inkjet receiver coating comprises pigments, especially silica, and a crosslinked polymer such as polyvinyl alcohol (PVA).

During private research, the inventor has also encountered problems with subsequent impregnation and lamination of printed paper. In particular, during said private research the inventor has found that inkjet printed paper can lead to paper splitting issues in laminate panels. This paper splitting is caused by insufficient bonding of the paper fibers, the décor paper fibers are not 100% saturated and covered with a thermosetting resin.

SUMMARY

The present invention aims in the first place to provide an alternative method, which, in accordance with several of its preferred embodiments, is directed to solve one or more of the problems arising in the state of the art.

Thereto, the present invention, according to its first independent aspect, relates to a method for manufacturing a laminate assembly that comprises the steps of providing a decorative paper, impregnating said decorative paper with a first thermosetting resin, laminate said resin provided decorative paper on a substrate, with the characteristic that the method comprises the step of impregnating said decorative paper with a second thermosetting resin before being laminated. The inventor has found that by impregnating the decorative paper via multiple impregnation steps it is possible to improve the absorption of the resin by the paper so that subsequent lamination is improved, and risk of splitting can be reduced.

Preferably said first resin is provided to satisfy less than the 50% of the absorption capacity of the decorative paper, even more preferably less than the 30% of said absorption capacity. By firstly satisfying a limited fraction of said absorption capacity, the paper may subsequently be more prone to absorb the second resin, thereby completely satisfying the absorption capacity and improving the lamination. In the preferred embodiment of the invention, said first resin can preferably satisfy at least the 5% of the absorption capacity of the decorative paper preferably less than the 50% of said absorption capacity. In a preferred embodiment of the invention the first resin can be provided in an amount of at least 3.5 g/sqm, dry weight, on the decorative paper, for example of at least 7 g/sqm on the decorative paper. In a preferred embodiment of the invention the first resin can be provided in an amount of less than 50 g/sqm on the decorative paper, for example of less 35 g/sqm on the decorative paper.

In the preferred embodiment, the second resin is provided to satisfy up to the 100% of the absorption capacity of the decorative paper. In a preferred embodiment of the invention the second resin can be provided in an amount of at least 20 g/sqm, dry weight, on the decorative paper, for example of at least 40 g/sqm on the decorative paper. In a preferred embodiment of the invention the second resin can be provided in an amount of less than 120 g/sqm on the decorative paper, for example of less 100 g/sqm on the decorative paper In a preferred embodiment between the first and the second impregnation steps the decorative paper can be at least partially dried. Preferably, during said drying step the water content in the decorative paper is reduced to a residual content below 30%, preferably below 20%. Preferably, during said drying step the water content in the decorative paper is reduced to a residual content above 3%. By reducing the water content in the decorative paper between two separate impregnation steps, it is possible to restore the absorption capacity of the decorative paper in order to improve the impregnation during the second step.

According to the preferred embodiment, said first and second thermosetting resins are different each other. Preferably, said first thermosetting can comprise at least, or be constituted by, an amino-based resin, such as melamine-based resin. Such melamine-based resin is a resin that polycondensates while exposed to heat in a pressing operation. The polycondensation reaction creates water as a by-product. In the preferred embodiment the thermosetting resin can comprise at least melamine formaldehyde resin, preferably with a formaldehyde to melamine ratio of 1.4 to 2. Alternative example of thermosetting resin can comprise urea formaldehyde resin, etherified melamine formaldehyde resin, polyurethane dispersion, (meth)acrylates, polyvinyl alcohol, polyvinyl acetates, casein, starch and/or combinations thereof.

In a preferred embodiment the first resin can comprise a low solid content, preferably below 50%, even more preferably below 45% on a weight basis. The inventor have surprisingly found that in this way impregnation of the resin can be improved and risk of splitting minimize, as the impregnation time is lower because of a lower viscosity of the first resin. In this case, it is particularly preferred that the first resin comprises a formaldehyde based resin, for example urea-formaldehyde resin, and melamine-formaldehyde resin.

Advantageously said first resin can show, during application, a viscosity below 20s measured with a Din Cup 4. The inventors have found that this value is found ideal to optimize the impregnation of the first resin and to reduce the risk of paper splitting. Said low viscosity has been found particularly preferred when the first resin is a (meth)acrylates resin or, more in general, a resin different from formaldehyde based resin.

It is noted that the desired effect of reducing the viscosity of the first resin to improve subsequent impregnation of the second resin can be expressed in form of a low solid content of the first resin in case the first resin itself is provided in a fluid form, for example in a water-based suspension. This is preferably, but not necessarily, the case of formaldehyde-based resins. In case of the first resin is provided with a higher amount of solid, even up to 100%, the viscosity is preferably to be kept below 20s measured with Din Cup 4. This is particularly, but not necessarily, the case of resins not in form of formaldehyde based resin, like (meth)acrylate resins.

Preferably, said second thermosetting resin can comprise at least, or be constituted by, an amino-based resin, such as melamine-based resin. Such melamine-based resin is a resin that polycondensates while exposed to heat in a pressing operation. The polycondensation reaction creates water as a by-product. In the preferred embodiment the thermosetting resin can comprise at least melamine formaldehyde resin, preferably with a formaldehyde to melamine ratio of 1.4 to 2. Alternative example of thermosetting resin can comprise urea formaldehyde resin, etherified melamine formaldehyde resin, polyurethane dispersion, (meth)acrylates, polyvinyl alcohol, polyvinyl acetates, casein, starch and/or combinations thereof.

In the preferred embodiment the second resin can comprise a solid content higher than the first resin. Preferably the second resin comprises a solid content between 45% and 62%.

Advantageously said second resin can show, during application, a viscosity below 20s measured with a Din Cup 4. The inventors have found that this value is found ideal to optimize the impregnation of the second resin and to reduce the risk of paper splitting. Said low viscosity has been found particularly preferred when the second resin is a (meth)acrylates resin or, more in general, a resin different from formaldehyde based resin.

According to a deviant embodiment, the first and the second thermosetting resin can be the same.

Preferably the step of providing said paper layer with thermosetting resin involves applying a mixture of water and the resin on said paper layer. In alternative embodiments the water contained in said mixture can be substituted by a solvent, for example an organic solvent; in further alternative embodiments the thermosetting resin can be applied in solid form. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or gravure rollers and/or doctor blades to set the amount of resin added to the paper layer.

Preferably, the obtained resin provided paper layer, i.e. after provision of the thermosetting resin, has a relative humidity lower than 15%, and still better of 10% by weight or lower.

In the preferred embodiment of the invention the decorative paper comprises a base paper. Said base paper being an impregnable paper for laminate panels, i.e. a paper that is suitable for being impregnated with a thermosetting resin. For example, the paper can have a base paper weight, i.e. higher than 20 grams per square meter, preferably between 50 to 100 grams per square meter, e.g. between 60 and 80 grams per square meter. Preferably, the paper is opaque and/or contains titanium oxide as a whitening agent and/or other inorganic fillers. Alternatively, the paper may be a colored, pigmented and/or dyed base paper. The paper layer can show a mean air resistance as expressed in Gurley value below 40 sec, preferably below 25 sec. Paper showings said mean air resistance are more prone to impregnation with resins.

In the preferred embodiment, the decorative paper can comprise an ink receiver layer. Said ink receiver layer can comprise at least a binder and/or a pigment. The ink receiver layer can help reducing the quantity of the ink to be delivered onto the printable substrate.

Said ink receiver layer can be provided on the paper or foil in a predetermined amount between 0.5 g/sqm and 5 g/sqm dry.

Preferably, said substrate is provided with 0.2 to 10 g/m$^2$, and preferably between 0.5 and 5 g/m$^2$ dry coating weight of pigment in said ink receiver layer. Preferably said pigment has a BET surface area between 10 and 1600 m$^2$/g, and preferably between 15 and 500 m$^2$/g.

According to the most preferred embodiment, for the pigment of said ink receiver layer at least or mainly silica particles are used.

According to variants, for the pigment of said ink receiver layer at least or mainly particles are used chosen from the list consisting of calcium carbonate, alumina, aluminosilicates, ordered mesoporous materials, modified silica, organosilica, modified organosilica, organoalumina, modified alumina, aluminates, modified aluminates, organoaluminates, modified organoaluminates, zeolites, metal organic frameworks and porous polar polymers.

According to some embodiments, the ink receiver layer can also be pigment free. The inventor has found that by limiting the quantity of pigment into the ink receiver layer it is possible to improve lamination of the decorative layer.

Preferably, said printable substrate is provided with 0.2 to 7 g/m$^2$, and preferably between 0.5 and 5 g/m$^2$, dry coating weight of a binder in said ink receiver layer. According to the most preferred embodiment, for the binder in said ink receiver layer at least or mainly polyvinyl alcohols are used.

According to variants, the ink receiver layer includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl cellulose; sodium cellulose; carboxymethyl sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution.

As stated above preferred binders for the ink receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

Preferably, said ink receiver layer has, globally seen, a pigment to binder ratio between 0/1 or 0.01/1 and 25/1, preferably between 0/1 or 0.01/1 and 20/1. It is not excluded that the ink receiver layer is non uniform and shows layerwise or areawise differences in composition, in which case the above values are average values for the totality of the inkjet receiver layer.

The ink receiver layer can further comprise a crosslinking agent. Preferably, the ink receiver layer can preferably comprise a content of crosslinking agent below 5% based on dry weight of the composition. The crosslinking agent can be preferably selected from the group comprising: aldehydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The ink receiver layer can further comprise a dispersant. A dispersant is an oligomer or polymer which stabilize the liquid dispersions of pigment contained in the ink against flocculation. The dispersant can comprise polycarboxylates, polyphosphates, a polyionic polymer, preferably polyDAD-MAC (Polydiallyldimethylammonium chloride) polyamine or alumina salts.

Preferably, the ink receiver layer is provided with less than 10%, more preferably less than 5% based on dry coating weight of dispersant, for example between 5 and 0%. Preferably, said ink receiver layer has, globally seen, a pigment to dispersant ratio between 10/1 and 100/1.

The ink receiver layer can also comprise a flocculant, preferably a metal salt, preferably a cationic metal salt. Preferably said metal salt is chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate. The positive ion of the dissolved metal salt will tend to neutralize the electrosteric stabilization function of the pigment contained in the ink thereby improving its absorption. The most preferred cationic metal salts are CaCl2, MgCl2, CMA, Calcium Acetate, calcium nitrate and Magnesium Acetate, as the inventors have obtained the best results with these ink reactive compounds. Said flocculant can also be chosen from the list consisting of sodiumaluminate, a double sulphate salt such as alum, polyaluminumchloride, polyacrylate, dicyandiamide (e.g. Floquat DI5 from SNF) and polyacrylamide. The flocculating agent pulls the ink pigments out of the ink dispersion. Thereby the pigments are prevented from penetration to far down into the ink receiver layer. Mainly the vehicle of the ink, e.g. the water in the case of waterbased inks, is absorbed deeper down into the ink receiver layer.

Preferably, ink receiver layer is provided with 20 to 60%, based on dry coating weight of flocculating agent, in particular of metal salt.

The ink receiver layer may also comprise one or more of the following agents:

Agents altering, more particularly lowering, the Ph of said ink receiver layer. Preferably the Ph of the ink receiver layer composition is lowered to Ph 6 or lower, by selecting the amount and type of said agent, which selection is within the ambit of the skilled man. Preferably said agent is chosen from the list consisting of formic acid, tartaric acid, acetic acid, hydrochloric acid, citric acid, phosphoric acid, sulfuric acid, AlC13 and boronic acid. An adjusted, more particularly lowered Ph, preferably to Ph 6 or less, increases the chemical affinity of the inkjet receiver layer with the ink and will interfere with the electrosteric stabilization function on the pigment, such that the dispersion of the pigments in the ink will become destabilized quickly.

Particle surface modifying agents or coupling agents: between 0.05 and 5 $g/m^2$, preferably between 0.2 and 2 $g/m^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.

Additives: wetting agent between 0.005 and 1 $g/m^2$, preferably between 0.05 and 0.5 $g/m^2$; and/or defoaming agent between 0.005 and 1 $g/m^2$, preferably between 0.05 and 0.5 $g/m^2$; and/or fungicide between 0.005 and 1 $g/m^2$, preferably between 0.05 and 0.5 $g/m^2$.

Preferably said ink receiver layer is provided on the paper or foil before the printing operation, for example said ink receiver layer is provided in line with said printer.

Preferably the inks can be pigment containing inks. Pigmented inks have a higher lightfastness than dye containing inks, moreover thanks to the use of pigments it is possible to use a reduced quantity of ink to obtain the printed pattern. The inventor has found that by reducing the quantity of ink for forming the pattern it is possible reduce the risk of lamination issues. For example, the printing operation can comprise depositing on the printable substrate an average dry quantity of pigment below 9 g/sqm, more preferably below 5 g/sqm.

Preferably, the method of the first aspect of the invention, the resin provided paper layer is laminated onto a substrate for forming a decorative panel. The substrate can be a wood-based board or panel, preferably a such as a particle board or an MDF or HDF board. Preferably, the method of the first aspect of the invention is a floor panel manufacturing method and comprises the step of providing said substrate with coupling elements for mechanical coupling to another floor panel. Said step of providing the substrate with coupling element is preferably performed after said pressing under heat step. It is noted that said substrate can also be in form of large board that, after said pressing under heat step, are cut into multiple laminate panel.

Preferably, the method of the first aspect of the invention further comprises the step of applying a counter layer or balancing layer at the surface of the substrate opposite the printed paper layer. The counter layer or balancing layer preferably comprises a paper layer and thermosetting resin, preferably the same resin as the top layer.

It is also possible that decorative panel comprises a wear layer above said decorative paper. Said wear layer can comprise said thermosetting resin, preferably an overlay paper impregnated with said thermosetting. Preferably the thermosetting resin of the wear layer comprises at least melamine formaldehyde resin or etherified melamine resin. According to an embodiment of the invention it is possible that the thermosetting resin of the wear layer is the same of at least one of the first or second resin impregnating the decorative paper, preferably the second resin. In any case it is not excluded that the wear layer and the decorative layer comprise different thermosetting resin. The wear layer, preferably, is a transparent or translucent layer. The wear layer can comprise wear resistant particles, preferably aluminum dioxide.

Preferably the mutual adherence of the decorative paper, the substrate, the possible counter layer and the possible wear layer is obtained in one and the same press treatment. According to the most preferred embodiment of the invention, these steps are taken up in a DPL process. According to alternative embodiments these steps are taken up in a CPL or in a HPL process. As is clear from the above, said lamination comprises the step of hot pressing the resin provided decorative paper, at least to cure the resin of the obtained resin provided decor paper. It is of course not excluded that the method of the invention would form part of a CPL (Compact Laminate) or an HPL (High Pressure Laminate) process in which the decorative layer is hot pressed at least with a plurality of resin impregnated core paper layers, e.g. of so called Kraft paper, forming a substrate underneath the decorative layer, and wherein the obtained pressed and cured laminate layer, or laminate board is, in the case of an HPL, glued to a further substrate, such as to a particle board or an MDF or HDF board.

According to a second independent aspect the invention may relate to a method for manufacturing a decorative paper for decorative panels, comprising the steps of: providing a printable paper; printing a decorative pattern on a surface of printable paper; impregnating said printed paper with a thermosetting resin. The method of the second independent aspect can comprise the characteristic according to one or more of the following possibilities.

According to a first possibility said resin can provided to satisfy less than the 50% of the absorption capacity of the decorative paper, even more preferably less than the 30% of said absorption capacity. By firstly satisfying a limited fraction of said absorption capacity, the paper may subsequently be more prone to absorb the second resin, thereby completely satisfying the absorption capacity and improving the lamination. In the preferred embodiment of said second aspect, said first resin can preferably satisfy at least the 5% of the absorption capacity of the decorative paper preferably less than the 50% of said absorption capacity. In a preferred embodiment of the second aspect the first resin can be provided in an amount of at least 3.5 g/sqm, dry weight, on the decorative paper, for example of at least 7 g/sqm on the decorative paper. In a preferred embodiment of the invention the first resin can be provided in an amount of less than 50 g/sqm on the decorative paper, for example of less 35 g/sqm on the decorative paper.

According to a second possibility said resin can comprise at least, or be constituted by, an amino-based resin, such as melamine-based resin. Such melamine-based resin is a resin that polycondensates while exposed to heat in a pressing operation. The polycondensation reaction creates water as a by-product. In the preferred embodiment the thermosetting resin can comprise at least melamine formaldehyde resin, preferably with a formaldehyde to melamine ratio of 1.4 to 2. Alternative example of thermosetting resin can comprise urea formaldehyde resin, etherified melamine formaldehyde resin, polyurethane dispersion, (meth)acrylates, polyvinyl alcohol, polyvinyl acetates, casein, starch and/or combinations thereof.

In the preferred embodiment of the invention, said resin is provided inline with the printer for printing said pattern. Preferably the step of providing said paper layer with thermosetting resin involves applying a mixture of water and the resin on said paper layer. In alternative embodiments the water contained in said mixture can be substituted by a solvent, for example an organic solvent; in further alternative embodiments the thermosetting resin can be applied in solid form. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or gravure rollers and/or doctor blades to set the amount of resin added to the paper layer.

After the impregnation step the decorative paper can be at least partially dried. Preferably, during said drying step the water content in the decorative paper is reduced to a residual content below 30%, preferably below 20%; and/or wherein during said drying step the water content in the decorative paper is reduced to a residual content above 3%.

In the preferred embodiment, said printer is a of the roll-to-roll type, wherein the paper is uncoiled from a first roll, printed upon and then rolled up again in a second roll. In some embodiments of the second aspect the decorative paper is rolled up in the second roll when after that the decorative paper has been provided with the resin.

In the preferred embodiment, said printer is an inkjet printer. Preferably, said inkjet printer can be of the single pass type, although in alternative embodiments multipass type is not excluded. Preferably, the inks can be pigment containing inks. Pigmented inks have a higher lightfastness than dye containing inks, moreover thanks to the use of pigments it is possible to use a reduced quantity of ink to obtain the printed pattern. The inventor has found that by reducing the quantity of ink for forming the pattern it is possible reduce the risk of lamination issues. For example, the printing operation can comprise depositing on the printable substrate an average dry quantity of pigment below 9 g/sqm, more preferably below 5 g/sqm. In the preferred embodiment, the inks are part of the of a set comprising multiple colors, said colors comprise at least two, preferably four colors selected form the group consisting of: black, cyan, yellow, magenta and red.

According to a preferred embodiment of the invention, the said printable paper comprises an ink receiver layer. It is noted that said ink receiver layer of the second aspect can comprise one or more of the features described in the first independent aspect.

The printable paper of the second aspect can comprise one or more of the features described in the first independent aspect with reference to the base paper, in particular on or more of the characteristics of the base paper and of the ink receiver layer can correspond to those described in relation to first independent aspect.

It is further noted that the fact that the decorative paper is impregnated with a resin that has a low solid content forms a inventive aspect independently from the fact that the paper can be impregnated in multiple step and/or using multiple resins. Thereto, according to a third independent aspect the invention relates to a method for manufacturing a laminate assembly, preferably a laminate panel, that comprises the steps of providing a decorative paper, impregnating said decorative paper with a first thermosetting resin, laminate said resin provided decorative paper on a substrate, with the characteristic that said first thermosetting resin shows a solid content below 50%, even more preferably below 45% on a weight basis. In the most preferred embodiment of the invention according to the third independent aspect, the resin preferably comprises a formaldehyde resin, preferably a melamine-formaldehyde resin. The method of the third aspect can comprise one or more of the characteristics described in relation to the first independent aspect. In particular, the characteristics of the decorative paper, of the lamination step on the first and/or second impregnation step and/or on the drying steps can correspond to those of the first independent aspect.

It is further noted that the invention also relates to a laminate assembly, preferably a laminate panel, obtainable through a method according to the first and/or third independent aspect. Thereto, according to its fourth independent aspect invention may relate to a laminate assembly, preferably a decorative laminate panel, comprising a substrate and top layer, wherein said top layer comprises at least a decorative layer and wherein said decorative layer at least comprises a decorative paper that is impregnated with a first thermosetting resin and wherein:

said decorative paper is further impregnated with a second thermosetting resin that differs from the first thermosetting resin; and/or said first thermosetting resin comprises a solids content below 50%, more preferably below 45%. The laminate assembly of the fourth aspect can comprise one or more of the characteristics described in relation to the first independent aspect. In particular, the characteristics of the decorative paper, of the substrate, of the first and/or the second resins and/or of the wear layer can correspond to those described in relation to the first independent aspect.

It is further noted that the invention also relates to a decorative paper, obtainable through a method according to the second independent aspect. Thereto, according to its fifth independent aspect, the invention may relate to decorative paper for laminate panel comprising a base paper and a thermosetting resin at least partially impregnating said base paper, wherein:

said thermosetting resin satisfies less than 50% of impregnation capacity of the base paper; and/or said decorative paper comprise an amount of thermosetting resin below 50 g/sqm; and/or said first thermosetting resin comprises a solids content below 50%, more preferably below 45%. The decorative paper of the fifth aspect can comprise one or more of the characteristics described in relation to the first and second independent aspect. In particular, the characteristics of the base paper and of the ink receiver layer can correspond to those described in relation to first independent aspect and/or of the first second resins can correspond to those described in relation to the first and/or second independent aspect.

It is noted that the most preferred embodiment of the invention relates to a method for manufacturing a laminate assembly that comprises the steps of providing a decorative paper, impregnating said decorative paper with a first thermosetting resin, laminate said resin provided decorative paper on a substrate, with the characteristic that the method comprises the step of impregnating said decorative paper with a second thermosetting resin before being laminated. In this most preferred example, the first resin satisfies between the 35 and 50% of the absorption capacity of the decorative layer and the second resin satisfies the remaining absorption capacity of the decorative paper up to the 100% or more. It is also preferable that the first and the second resin are the same, preferably melamine formaldehyde resin, and that the first resin is provided with a lower solid content than the second resin, in particular the first resin can have a solid content of below 45% on a weight basis. Alternatively, the first and the second resin are different and preferably are respectively (meth)acrylate resin and melamine formaldehyde resin. In this second case it is preferable that the first resin is provided having a viscosity below 20s measured with Din Cup 4.

BRIEF DESCRIPTION OF THE DRAWINGS

With the intention of better showing the characteristics of the invention, in the following, as an example without any limitative character, several preferred forms of embodiments are described with reference to the accompanying drawings, wherein.

DESCRIPTION ON NON-LIMITING EMBODIMENTS

Figures 1, 2, 4:
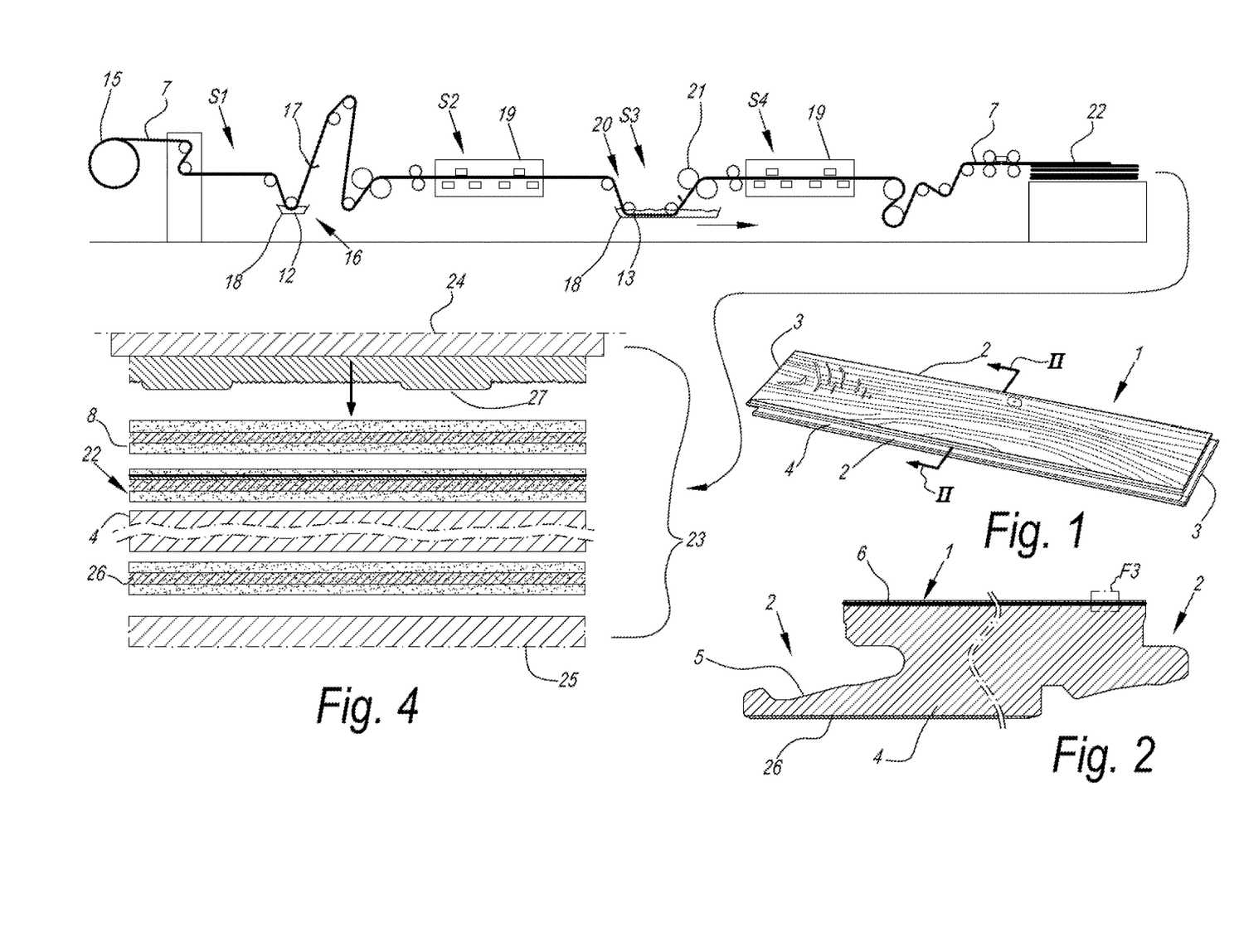
FIG. 1 shows a perspective view of a laminate panel according to the invention.
FIG. 2 shows an enlarged view of the section of the panel according to view II-II of FIG. 1.
FIG. 4 shows some steps in a method according to a first aspect of the invention.

FIGS. 1 and 2 illustrates a decorative panel 1, in the case, preferably a floor panel. FIG. 1 illustrates that the decorative panel or laminate panel 1 can have the shape of a rectangular and oblong laminate floor panel, with a pair of long sides 2 and a pair of short sides 3 and having an HDF or MDF substrate 4. As shown in FIG. 2, the decorative panel 1 is provided at its edges 2,3 with coupling means 5, for example in form of tongue and groove, allowing to lock the respective edges, 2,3 together with the edges of a similar panel both in a direction R1 perpendicular to the plane of the coupled panels, and in a direction R2 perpendicular to the coupled sides and in the plane of the coupled panels.

Figures 3, 5:
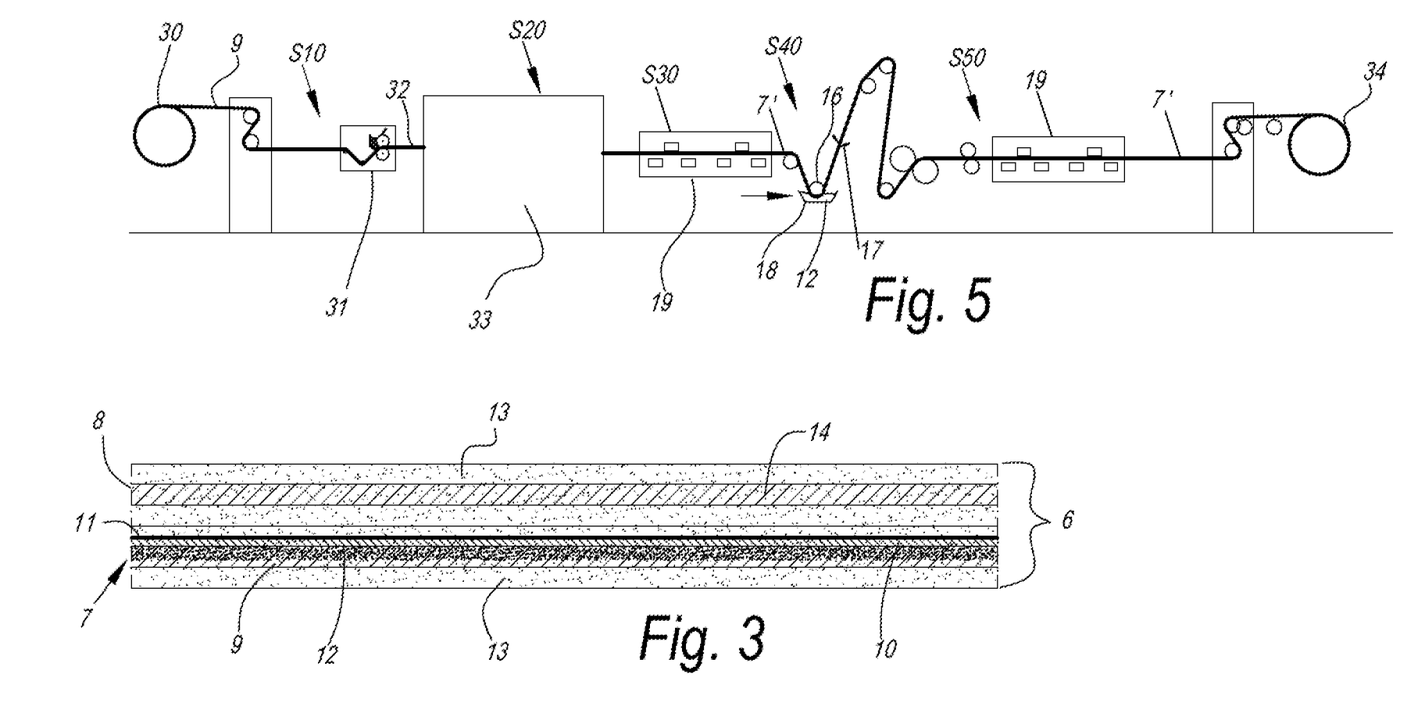
FIG. 3 shows an enlarged view of the area F3 of FIG. 2.
FIG. 5 shows some steps in a method according to a second aspect of the invention.

FIGS. 2 and 3 further shows that the decorative panel 1 comprises a top layer 6. The top layer 6 comprises a decorative paper 7 and a wear layer 8. In the example the wear layer 8 is in form of an overlay paper. The decorative paper 7 comprises a base paper 9, an ink receiver layer 10 and inkjet printed pattern 11, preferably representing a wood décor.

The base paper 9 is an impregnable paper for decorative laminate and preferably shows a weight between 60 and 80 grams per square meter and a mean air resistance as expressed in Gurley value below 40 sec, preferably below 25 sec.

The ink receiver layer 10, in the example, comprises at least a binder, preferably polyvinyl alcohol, a cation metal salt, preferably CaCl2, and a pigment, preferably silica.

The printed pattern 11 is formed by pigment containing inks, preferably the pigments comprise at least four pigments selected from the group formed by; cyan, yellow, red, magenta, and black. The decorative paper comprises a dry amount of pigment in the printed pattern 11 of below 9 g/sqm.

As shown in FIG. 3, the decorative paper 7 is impregnated with a first 12 and a second resin 13.

The first resin 12, in the example, impregnates the core of the decorative paper 7 and has the scope of improving adhesion between the second resin 13 and the ink receiver layer 10. The first resin is a melamine-formaldehyde based resin, —or alternative a (meth)acrylate resin and is present in the decorative paper in a dry weight amount between 3.5 and 50 g/sqm.

Especially in case the first resin 12 is a melamine-formaldehyde resin it is preferable that it comprises a solid content below 45% solids.

The second resin 13, in the example, impregnates the outer portions of the decorative paper 7 and has the scope of improving adhesion between the decorative paper 7, the substrate 4 and the wear layer 8. The second resin is a melamine-formaldehyde based resin having a solid content between 45 and 62%. and is present in the decorative paper in a dry weight amount between 20 and 100 g/sqm.

The wear layer 8 comprises an overlay paper 14 impregnated by a thermosetting resin, said thermosetting resin of the wear layer being, in the example, the same as the second resin 13 of the decorative paper 12.

FIG. 4 illustrates some steps of a method for manufacturing laminate panels 1 of the type shown in figures from 1 to 3. The method forms an illustration of the first independent aspect of the invention as described in the introduction of the present patent application. The method of the exemplary embodiment comprises at least the step S1 of providing said decorative paper 7 with the first thermosetting resin 12. Hereto the decorative paper 7 is taken from a roll 15 and transported to a first impregnation station 16, where said decorative paper 7 is immersed in a bath 18 of said first thermosetting resin 12, more particularly a mixture of water and thermosetting resin composition 12. The decorative paper 7 is then allowed to rest while in this case being transported upwards. The resting allows for the first resin 12 to penetrate the paper core. In the example several doctor blades 17 are available for partially removing the first resin in excess at the surface of the resin provided decorative paper 17.

Especially in case the first resin 12 is (meth)acrylate resin, it is preferred that in the bath 18 shows a viscosity below 20s measured with a Din Cup 4.

Preferably, the decorative paper 7 is impregnated with a dry weight amount of between 3.5 and 50 g/sqm of the first thermosetting resin, for example in this way only less of 50% of the impregnation capacity of the decorative paper 7 is satisfied by the first thermosetting resin 12.

In a second step S2 the resin provided décor paper 7 is dried and its residual humidity level is brought to below 20%. In the example hot air ovens 19 are used, but alternatively other heating equipment can be used, such as microwave or infrared drying equipment. In this way impregnation capacity of the paper 7 can be partially restored.

The décor paper 7 then, in a step S3, comes into a second impregnation station 20 where the decorative paper is immersed in a second bath 18 of second thermosetting resin 13, more particularly a mixture of water and second thermosetting resin 13 composition. A set of squeezing rollers 21 allows to dose the amount of second resin 13 applied to the decorative paper 7.

Preferably, the decorative paper 7 is impregnated with a dry weight amount of between 20 and 100 g/sqm of second resin 13, for example in this way the impregnation capacity of the decorative paper 7 is fully satisfied by the second thermosetting resin 13.

In a fourth step S4 the resin provided décor paper 7 is dried and its residual humidity level is brought to below 10%. In the example, hot air ovens 19 are used, but alternatively other heating equipment can be used, such as microwave or infrared drying equipment.

FIG. 4 also illustrates that the continuous resin provided décorative paper 7 is cut to sheets 22 and stacked.

FIG. 4 further illustrates that in a subsequent step S5 one the obtained sheet 22 of the resin provided decorative paper 7 is taken up in a stack to be pressed in a short daylight press 23 between upper and lower press plates 24-25. Said stack comprises from bottom to top a counter layer 26, a plate shaped substrate 4, the abovementioned resin provided decorative paper 7 and a wear layer 8, wherein the counter layer 26 and the wear layer 8 both comprise a paper sheet impregnated with a thermosetting resin, preferably the second thermosetting resin 13. The stack is then pressed and the press treatment results in a mutual connection between the constituent layers Jul. 4, 2026-8 of the stack, as well as in a hardening or curing of the available first and second thermosetting resin 12,13.

The upper press plate 24 is a structured press plates that provides a relief in the surface of the panel 1 during the same press treatment of the step S5, by bringing the structured surface 27 of the upper press plate 240 into contact with the resin of the wear layer 8.

FIG. 5 shows some steps in a method for manufacturing a decorative paper 7' according to a second independent aspect of the invention. The method of the example comprises at least the step S10 of providing a base paper 9 by uncoiling it from a first roll 30 to a coating station 31 for applying the ink receiver coating 10 onto the base paper 9 to obtain a printable paper 32. In the example the base paper 9 and the ink receiver coating 10 comprise features described above in relation to FIG. 2. The printable paper 32 so guided to a printer 33 for performing a step S20 of printing the printed pattern 11 on top of the printable paper 32. In the example, the inkjet printer 33 is a single pass printer configured to eject droplets of pigment containing inks, preferably water-based, on the printable paper 32. Preferably said inks comprise at least four inks selected from the group formed by; cyan, yellow, red, magenta, and black. The inkjet printer 33 is configured to print a dry amount of pigment in the printed pattern 11 of below 9 g/sqm. The method illustrated in FIG. 5 comprises the step S30 of drying the printed paper thereby obtaining a decorative paper 7' preferably having the same characteristic of those at the beginning of the aspect of the invention. In the example hot air ovens 19 are used, but alternatively other heating equipment can be used, such as microwave or infrared drying equipment.

The method of FIG. 5 further comprises the step S40 of providing said decorative paper 7' with the first thermosetting resin 12. Hereto the decorative paper 7' is transported to an impregnating or coating station 16, where said decorative paper 7' is immersed in a bath 18 or a coating is applied of said first thermosetting resin 12, more particularly a mixture of water and thermosetting resin composition 12 and an impregnated decorative paper 7' is obtained. The impregnated decorative paper 7' is then allowed to rest while in this case being transported upwards. The resting allows for the first resin 12 to penetrate the paper core. In the example several doctor blades 17 are available for partially removing the first resin in excess at the surface of the resin provided decorative paper 7'.

Preferably, the impregnated decorative paper 7' is impregnated with a dry weight amount of between 3.5 and 50 g/sqm of the first thermosetting resin, for example in this way only less of 50% of the impregnation capacity of the decorative paper 7' is satisfied by the first thermosetting resin 12.

In a drying step S50 the resin provided decorative paper 7' is dried and its residual humidity level is brought to below 10%. In the example hot air ovens 19 are used, but alternatively other heating equipment can be used, such as microwave or infrared drying equipment. The impregnated decorative paper 7' is then rolled up in a second roll 34.

The impregnated decorative paper 7' can be used in a method for manufacturing of laminate panel similar to that described in FIG. 4, with the difference that the decorative paper is uncoiled from the second roll 34 and transported directly to the second impregnation station 18 for the second impregnation step S3 where the impregnated decorative paper 7' is impregnated with the second resin composition 13.

The present invention is in no way limited to the hereinabove described embodiments, but such method may be realized according to different variants without leaving the scope of the present invention.

Further, as is clear from the content of the description, the present invention relates to one or more of the items as listed below, numbered from 1 to 37:

1. A method for manufacturing a laminate assembly that comprises the steps of providing a decorative paper, impregnating said decorative paper with a first thermosetting resin, laminate said resin provided decorative paper on a substrate, with the characteristic that the method comprises the step of impregnating said decorative paper with a second thermosetting resin before being laminated.

2. The method according to item 1, wherein said first resin is provided to satisfy less than the 50% of the absorption capacity of the decorative paper, preferably less than the 30% of said absorption capacity.

3. The method according to item 1 or 2, wherein said first resin satisfies at least the 5% of the absorption capacity of the decorative paper preferably less than the 50% of said absorption capacity.

4. The method according to any of the preceding items, wherein the first resin is be provided in a dry weight amount of at least 3.5 g/sqm on the decorative paper, for example of at least 7 g/sqm on the decorative paper; and/or wherein the first resin is provided in a dry weight amount of less than 50 g/sqm on the decorative paper, for example of less 35 g/sqm on the decorative paper.

5. The method according to any of the preceding items, wherein the preferred embodiment, the second resin is provided to satisfy up to the 100% or more of the absorption capacity of the decorative paper.

6. The method according to any of the preceding items, wherein the second resin is provided in a dry weight amount of at least 20 g/sqm on the decorative paper, for example of at least 40 g/sqm on the decorative paper; and/or wherein the second resin is provided in a dry weight amount of less than 120 g/sqm on the decorative paper, for example of less 100 g/sqm on the decorative paper.

7. The method according to any of the preceding items, wherein the first resin has a lower solid content than the second resin.

8. The method according to any of the preceding items, wherein the first resin has a solid content below 45%, and/or wherein the second resin has a solid content between 45 and 62%, preferably when the first resin is melamine formaldehyde resin or urea formaldehyde resin; and/or wherein said first resin shows a viscosity below 20s measured with a Din cup 4, preferably when the first resin is a (meth)acrylate resin or different from a formaldehyde resin.

9. The method according to any of the preceding items, wherein between the first and the second impregnation steps the decorative paper can be at least partially dried.

10. The method according to item 9, wherein during said drying step the water content in the decorative paper is reduced to a residual content below 30%, preferably below 20%; and/or wherein during said drying step the water content in the decorative paper is reduced to a residual content above 3%.

11. The method according to any of the preceding items, wherein said first and second thermosetting resins are different each other.

12. The method according to any of the items from 1 to 10, wherein said first and second thermosetting resins are the same.

13. The method according to any of the preceding items, wherein said first resin is a melamine-formaldehyde based resin or a (meth)acrylate resin or combinations thereof.

14. The method according to any of the preceding items, wherein said second resin is a melamine-formaldehyde based resin.

15. The method according to any of the preceding items, wherein the step of providing said paper with thermosetting resin involves applying a mixture of water and the resin on said paper layer.

16. The method according to any of the preceding items, wherein the decorative paper comprises a base paper, preferably having a base paper weight, i.e. higher than 20 grams per square meter, preferably between 50 to 140 grams per square meter, e.g. between 60 and 80 grams per square meter.

17. The method according to item 16, wherein the decorative paper comprises a shows a mean air resistance as expressed in Gurley value below 40 sec, preferably below 25 sec.

18. The method according to any of the preceding items, wherein the decorative paper comprises an ink receiver layer, preferably said ink receiver layer comprising at least a binder and/or a pigment.

19. The method according to any of the preceding items, wherein the decorative paper comprises a printed pattern that is preferably formed using color pigments, preferably said decorative paper comprises an average dry quantity of pigment below 9 g/sqm, more preferably below 5 g/sqm.

20. The method according to any of the preceding items, wherein the substrate is a wood-based board or panel, preferably a such as a particle board or an MDF or HDF board.

21. The method according to any of the preceding items, that comprises laminating a wear layer together with said decorative paper, preferably said wear layer comprising an overlay paper impregnated with a thermosetting resin.

22. The method according to item 21, wherein said thermosetting resin of the wear layer is the same of at least one of the first or second resin impregnating the decorative paper, preferably the second resin.

23. The method according to any of the preceding items wherein said lamination step is part of a DPL, CPL or a HPL process.

24. A method for manufacturing a decorative paper for decorative panels, comprising the steps of: providing a printable paper; printing a decorative pattern on a surface of printable paper; impregnating said printed paper with a thermosetting resin.

25. The method according to item 24, wherein said resin is provided to satisfy less than the 50% of the absorption capacity of the decorative paper, preferably less than the 30% of said absorption capacity.

26. The method according to item 24 or 25, wherein said resin satisfies at least the 5% of the absorption capacity of the decorative paper preferably less than the 50% of said absorption capacity.

27. The method according to any of the items 24 to 26, wherein the resin is be provided in a dry weight amount of at least 3.5 g/sqm on the decorative paper, for example of at least 7 g/sqm on the decorative paper; and/or wherein the resin is provided in a dry weight amount of less than 50 g/sqm on the decorative paper, for example of less 35 g/sqm of the decorative paper.

28. The method according to any of the items 24 to 27, wherein after the impregnation steps the decorative paper can be at least partially dried.

29. The method according to item 28, wherein during said drying step the water content in the decorative paper is reduced to a residual content below 30%, preferably below 20%; and/or wherein during said drying step the water content in the decorative paper is reduced to a residual content above 3%.

30. The method according to any of the items 24 to 29, wherein said resin is a melamine-formaldehyde based resin or a (meth)acrylate resin or a combinations there of, preferably having a solid content below 45% in case it is melamine-formaldehyde based resin.

31. The method according to any of the items 4 to 30, wherein said impregnation or coating step is performed in line with said, preferably wherein said printer is a of the roll-to-roll type.

32. The method according to any of the items 24 to 31, wherein said printer is an inkjet printer.

33. A decorative paper for laminate panel obtainable with the method according to any of items from 24 to 32.

34. A decorative paper for laminate panel comprising a base paper and a thermosetting resin at least partially impregnating said base paper, wherein:
    said thermosetting resin satisfies less than 50% of impregnation capacity of the base paper; and/or
    said decorative paper comprise a dry weight amount of thermosetting resin below 50 g/sqm; and/or
    said thermosetting resin comprises melamine-formaldehyde based resin or a (meth)acrylate resin or combinations thereof.

35. A decorative laminate panel comprising a substrate and top layer, wherein said top layer comprises at least a decorative layer and wherein said decorative paper is impregnated with a first thermosetting resin and wherein:
    said decorative paper is further impregnated with a second thermosetting resin that differs from the first thermosetting resin; and/or
    said first thermosetting resin comprises a solid content below 45%; and/or
    said first resin has a lower solid content than the second resin.

36. The decorative laminate panel of item 35, wherein said first resin comprises a melamine formaldehyde-based resin or a (meth)acrylate resin or a combination thereof, preferably said second resin comprises melamine formaldehyde-based resin 37. A method for manufacturing a laminate assembly, preferably a laminate panel, that comprises the steps of providing a decorative paper, impregnating said decorative paper with a first thermosetting resin, laminate said resin provided decorative paper on a substrate, with the characteristic that said first thermosetting resin:

is a melamine-formaldehyde based resin or a (meth)acrylate resin or combinations thereof; and/or said first resin comprises a solid content below 45%, preferably in case of a melamine formaldehyde resin; and/or comprises a viscosity below 20s measured with a Din cup 4, preferably in case of (meth)acrylate resin.

The invention claimed is:

1. A method for manufacturing a laminate assembly, the method comprising:
   providing a decorative paper including a printed pattern;
   impregnating the decorative paper with a first thermosetting resin;
   laminating the resin provided decorative paper on a substrate; and
   impregnating the decorative paper with a second thermosetting resin before laminating;
   wherein the first thermosetting resin,
      is provided in a dry weight amount of at least 3.5 g/sqm on the decorative paper, and/or
      is provided in a dry weight amount of less than 50 g/sqm on the decorative paper;
   wherein the first and the second thermosetting resins are different from each other;
   wherein the first thermosetting resin is a (methacrylate resin;
   wherein the second thermosetting resin is a melamine formaldehyde based resin.

2. The method according to claim 1, wherein the first thermosetting resin satisfies less than 50% of the absorption capacity of the decorative paper; and/or
   wherein the first thermosetting resin satisfies at least 5% of the absorption capacity of the decorative paper.

3. The method according to claim 1, wherein the second thermosetting resin is provided to satisfy up to 100% or more of the absorption capacity of the decorative paper.

4. The method according to claim 1, wherein the second thermosetting resin is provided in a dry weight amount of at least 20 g/sqm on the decorative paper; and/or
   wherein the second thermosetting resin is provided in a dry weight amount of less than 120 g/sqm on the decorative paper.

5. The method according to claim 1, wherein the first thermosetting resin has a lower solid content than the second thermosetting resin.

6. The method according to claim 1, wherein the first thermosetting resin has a solid content below 45%; and/or
   wherein the second thermosetting resin has a solid content between 45 and 62%; and/or
   wherein the first thermosetting resin shows a viscosity below 20s measured with a Din cup 4.

7. The method according to claim 1, further comprising partially drying the decorative paper between impregnating with the first thermosetting resin and impregnating with the second thermosetting resin.

8. The method according to claim 1, wherein the decorative paper comprises a base paper having a base paper weight higher than 20 grams per square meter.

9. The method according to claim 1, wherein the printed pattern is formed using inkjet color pigments; and
   wherein the printed pattern comprises an average dry quantity of pigment below 9 g/sqm.

10. A method for manufacturing a laminate assembly, the method comprising:
    providing a decorative paper including a printed pattern;
    impregnating the decorative paper with a first thermosetting resin;
    laminating the resin provided decorative paper on a substrate;
    impregnating the decorative paper with a second thermosetting resin before laminating;
    wherein the first thermosetting resin,
       has a solid content below 45%, and/or
       has a viscosity below 20s measured with a Din cup 4;
    wherein the first and the second thermosetting resins are different from each other;
    wherein the first thermosetting resin is a (meth)acrylate resin;
    wherein the second thermosetting resin is a melamine-formaldehyde based resin.

11. A method for manufacturing a decorative paper for decorative panels, the method comprising:
    providing a printable paper;
    printing a decorative pattern on a surface of the printable paper; and
    impregnating the printed paper with a first thermosetting resin;
    impregnating the printed paper with a second thermosetting resin;
    wherein the first thermosetting resin,
       is provided in a dry weight amount of at least 3.5 g/sqm on the decorative paper, and/or
       is provided in a dry weight amount of less than 50 g/sqm on the decorative paper;
    wherein the first and the second thermosetting resins are different from each other;
    wherein the first thermosetting resin is a (methacrylate resin;
    wherein the second thermosetting resin is a melamine-formaldehyde based resin.

12. The method according to claim 11, wherein the first thermosetting resin is provided to satisfy less than the 50% of the absorption capacity of the decorative paper.

13. The method according to claim 11, wherein the first thermosetting resin satisfies at least the 5% of the absorption capacity of the decorative paper.

14. The method according to claim 11, further comprising partially drying the decorative paper after impregnating the decorative paper with the first thermosetting resin.

* * * * *